3,011,983
REFRACTORY AND METHOD OF MAKING THE SAME
Richard W. Ricker and Paul F. Wallace, New Kensington, Pa., assignors to Aluminum Company of America, Pittsburgh, Pa., a corporation of Pennsylvania
No Drawing. Filed Mar. 16, 1959, Ser. No. 799,474
4 Claims. (Cl. 252—520)

This invention relates to a composition of matter and method of making the same. More particularly it relates to a refractory composition composed essentially of a high melting point titanium-containing compound bonded by aluminum nitride which displays high electrical conductivity coupled with mechanical strength, high thermal stability and resistance to chemical attack.

In the electrolytic production of aluminum by the Hall process, it has been the usual practice to employ a carbonaceous lining of the reduction cell as the cathode. It is of primary importance that the electrodes used in the electrolytic cell have a high electrical conductivity in order to minimize power losses. However, the conventional carbon lining is subject to attack by the molten cryolite bath and the molten aluminum metal in the reduction pot causing a weight loss, volume increase, and breaks or cracks in the lining. This deterioration decreases the power efficiency of the cell.

Consequently, it is a primary object of this invention to provide a refractory composition that displays excellent resistance to attack by molten cryolite and molten aluminum, and practical methods for making the same.

It is another object of this invention to provide a refractory composition exhibiting a low electrical resistivity which is suitable for use as an electrode in an electrolytic cell for the production of aluminum.

It is still another object to provide a refractory composition that will permit normal handling and use without cracking, chipping or breaking.

These and other objects and advantages of the present invention will become evident from the following description and claims.

In accordance with the present invention, a refractory composition is produced which consists essentially of titanium cyanonitride and aluminum nitride, generally in the proportion of 70 to 85% by weight of the cyanonitride and 15 to 30% by weight of the aluminum nitride. This composition has a low electrical resistivity on the order of from 100 to $500 \times 10^{-6}$ ohm inches. At room temperature, the refractory has a compressive strength of from 20,0000 to 30,0000 pounds per square inch. Chemically, it is substantially inert to molten cryolite and liquid aluminum.

The titanium cyanonitride component consists essentially of a solid solution of TiN and TiC, as determined by X-ray diffraction analysis. The proportion of TiN to TiC determined by real density measurements is approximately three to one. The chemical formula usually ascribed to the cyanonitride is TiCN, but this is not accurate since it is not a definite stoichiometric compound.

Although such a refractory can be made in the conventional manner by mixing finely divided particles of titanium cyanonitride and aluminum nitride with a suitable temporary binder and subsequently firing the mass, a better method consists of preparing a mixture of the cyanonitride particles and aluminum powder, compressing the mixture into the desired shape at elevated temperature, and subsequently firing the hot-pressed shape in a nitrogen-containing atmosphere whereby substantially all of the aluminum is converted into aluminum nitride. In both instances, the aluminum nitride serves as a binding medium between the titanium cyanonitride particles.

The titanium cyanonitride employed in the present invention may contain impurities such as metallic zirconium, vanadium, iron and silicon, or oxides, carbides or nitrides of these elements as well as metallic titanium or oxides of titanium. It is preferable, however, that there be no free metallic elements in the mixture, other than aluminum, before firing, thus avoiding any undesirable oxidation and nitriding. The total impurities in the fired product, in any case, should not exceed 10%. Within this range, they have substantially no detrimental effect on the electrical resistivity and strength of the refractory.

The refractory composition is made from a mixture of 80 to 90% by weight of titanium cyanonitride of a minus 100 mesh particle size, and preferably a minus 325 mesh particle size, and 10 to 20% by weight of finely divided aluminum, preferably atomized aluminum powder of at least 99% purity, and of at least a minus 100 mesh particle size. The foregoing proportions have been found to be essential in making a fired product that will satisfactorily withstand attack by molten cryolite or molten aluminum metal.

The mixture is hot-pressed to form a desired shape by any of the well-known pressure molding methods immediately after blending the mixture, or the material can be stored to be pressed at a later period. The pressure used in fabricating the shape is preferably not less than 2500 pounds per square inch. The mixture is heated to about 650 to 700° C. for about 3 to 15 minutes while maintaining the mixture at a substantially constant pressure within the mold. Lower pressures or temperatures produce a low density body which in turn yields a highly porous fired product which is undesirable for withstanding attack by molten cryolite or molten aluminum. Similarly, heating the compressed mass for a shorter period than about 3 minutes does not produce a sufficiently compact product for withstanding attack by molten cryolite or molten aluminum. On the other hand, heating beyond the prescribed period may cause excessive reaction of aluminum with impurities introduced in the system such as entrapped gases. After the desired time has elapsed for hot-pressing the mixture, the pressure is released, and the hot-pressed shape is allowed to cool to approximately 300° C. before removal from the pressure mold.

The hot-pressed shape is fired in a non-oxidizing atmosphere containing a substantial amount of nitrogen, preferably at least 90% nitrogen, and is brought to the desired temperature by heating at a rate of approximately 45 to 60° C. per hour from room temperature to the soaking temperature of between about 1200 to 1800° C. It is neither necessary nor desirable to exceed 1800° C. because the reaction is complete within that range. A higher firing or soaking temperature may increase slightly the density or electrical conductivity of the final product, but this increase generally is not sufficient to warrant the higher temperatures. On the other hand, a soaking temperature lower than 1200° C. in ineffective. The molded body is soaked within that temperature range from about one to twenty hours, and in any event for a sufficient length of time to convert substantially all of the aluminum to aluminum nitride. Firing in a non-oxidizing atmosphere containing at least 90% nitrogen, and soaking at a minimum temperature of approximately 1200° C. are preferred for carrying out the reaction within a reasonable period of time. The length of the soaking period depends on the particular size and shape of the material being fired. Under the foregoing heating and soaking conditions, the titanium cyanonitride undergoes no change, and it is only the aluminum which is affected. After the nitriding is complete, the body is allowed to cool in the nitrogen atmosphere to approximately 300° C. before removal from the heating chamber.

In the preferred embodiment of our invention, we use oil pumped nitrogen as the non-oxidizing atmosphere. The final product exhibits a high electrical resistivity if the material is fired in the last stage in an atmosphere containing detectable amounts of oxygen or moisture. Therefore, as a precautionary step in insuring the removal of substantially all the oxygen and moisture from the oil pumped nitrogen, it should be purified by passing it through a purification train. In such a train, the nitrogen is first dehydrated, preferably by bubbling it through a concentrated solution of sulfuric acid, and then passing it through a column of magnesium perchlorate. The oxygen is then removed by passing the dehydrated gas through a column of steel wool or copper filings heated to approximately 800° C., and again dehydrated by passing through a column of magnesium perchlorate. A continuous flow of nitrogen may be maintained in this manner throughout the firing operation. The steel wool or copper may be regenerated with hydrogen before each run. Satisfactory results may also be obtained by heating the pressed shapes in a purified atmosphere of approximately 93% nitrogen and 7% hydrogen, or in an atmosphere of cracked ammonia.

The refractory made according to our invention may be used as the cathode in an aluminum reduction cell because of its high electrical conductivity, and superior mechanical strength and resistance to attack by molten cryolite and molten aluminum. Several cathode bars or rods, preformed and fired as described above, may be constructed to extend transversely through the pot lining and protrude into the cell. Electrical contact to the cathode rods or bars can be made in any known manner. The high electrical conductivity of the cathode rods enables the cell to operate with greater power efficiency and less cracking and distortion of the lining than a cell employing only a carbon lining as the cathode.

The fired refractory composition may also be employed as a crucible holder in the well-known sulfate test. This test involves determining the reactivity of carbon with oxygen by adding carbon to fused sodium sulfate. The new refractory will satisfactorily withstand the corrosive fumes of the sodium sulfate at 960° C.

The invention is illustrated by one specific example of the method of producing the refractory wherein a 300 gram refractory batch was prepared by mixing 255 grams of titanium cyanonitride of a minus 325 mesh size with 45 grams of atomized aluminum powder in a Waring Blendor at 80° C. for one hour. The mixture was charged into the cavity of a graphite mold which in turn was placed in a Nichrome wound electric furnace. This assemblage was placed on the bed of a hydraulic press, and 7500 pounds per square inch was applied to the powder mixture. The furnace was turned on, and the compressed mixture was heated to 675° C. for 5 minutes while maintaining a constant pressure. The mass was pressed into the form of a rod one inch in diameter and three inches in length. The furnace was shut off, the pressure released, and the hot-pressed shape was ejected from the mold while at a temperature of about 300° C. and allowed to cool to room temperature. The resulting shape was placed in a closed furnace chamber which was partially evacuated prior to the introduction of oil pumped nitrogen which has been passed through a purification train. The flow of nitrogen was maintained as the molded rod was heated at a rate of approximately 45° C. per hour from room temperature to 1300° C. and held at that temperature for five hours after which both the molded shape and furnace were allowed to cool to approximately 300° C. After removal from the furnace chamber the rod was examined and no evidence of cracking was observed. The refractory body had an approximate bulk density of 2.3 grams per cubic centimeter, and it was found to have an electrical resistivity of about $200 \times 10^{-6}$ ohm inches. In a mechanical property test it was determined that the rod had a compressive strength of approximately 22,500 pounds per square inch.

To ascertain the resistance to attack by molten cryolite and molten aluminum, samples of the refractory composition and of the conventional carbon pot lining were submerged in a typical reduction pot bath of molten cryolite containing aluminum oxide at 980° C. for four hours, and the samples were connected to a source of D.C. power so that they operated as cathodes in the same manner as a pot lining. An average current density of 5.0 amperes per square inch was maintained on the carbon sample while the refractory was exposed to a current density of 12.7 amperes per square inch. At the end of two hours, the refractory exhibited essentially no change in volume, a weight increase of 2%, and there was no evidence of attack by the bath nor by the molten aluminum formed during the reduction process. The carbon lining underwent a volume increase of 3%, a weight loss of 42.1% and was extensively attacked by the cryolite and molten aluminum.

It is to be understood that the composition and process of making it herein described may be varied without departing from the invention, and that the use of the products is not limited to any specific field or fields of application.

Having thus described the present invention, we claim:

1. A refractory composition consisting essentially of 70 to 85% by weight titanium cyanonitride and 15 to 30% by weight aluminum nitride characterized by a low electrical resistivity of from approximately 100 to $500 \times 10^{-6}$ ohm inches, and by substantially chemical inertness to molten cryolite and molten aluminum metal.

2. A refractory composition consisting essentially of 70 to 85% by weight titanium cyanonitride, 15 to 30% by weight aluminum nitride and not over 10% by weight of oxide impurities characterized by a low electrical resistivity of from approximately 100 to $500 \times 10^{-6}$ ohm inches, and by substantially chemical inertness to molten cryolite and molten aluminum metal.

3. A method of making an article of manufacture comprising mixing 80 to 90% by weight titanium cyanonitride with 10 to 20% by weight aluminum, both of said materials having a particle size of 100 mesh or finer, compressing the mass in a mold to form a shaped body, heating the shaped body to about 650 to 700° C. for about 3 to 15 minutes while maintaining the shaped body at substantially constant pressure, releasing the pressure and cooling the shaped body to approximately 300° C., removing said shaped body from the mold, heating said shaped body in a chamber containing a non-oxidizing atmosphere containing at least 90% nitrogen from substantially room temperature to a soaking temperature of between about 1200° C. to 1800° C., soaking said body within that temperature for a sufficient period to convert substantially all of the aluminum into aluminum nitride, cooling said body after the aluminum nitride has been formed, maintaining the gas flow until said body has cooled to approximately 300° C., removing said body from said chamber, and allowing said body to cool to room temperature in the atmosphere.

4. The method according to claim 3 wherein said body is slow fired in said non-oxidizing atmosphere at a rate of approximately 45 to 60° C. per hour.

References Cited in the file of this patent

UNITED STATES PATENTS

| | | |
|---|---|---|
| 2,439,290 | Fetterley | Apr. 6, 1948 |
| 2,480,475 | Johnson | Aug. 30, 1949 |
| 2,839,413 | Taylor | June 17, 1958 |